United States Patent [19]
Kikitsu et al.

[11] Patent Number: 5,780,135
[45] Date of Patent: Jul. 14, 1998

[54] MAGNETIC DISC APPARATUS

[75] Inventors: Akira Kikitsu; Katsutaro Ichihara, both of Yokohama, Japan

[73] Assignee: Kabushiki Kaisha Toshiba, Kawasaki, Japan

[21] Appl. No.: 712,434

[22] Filed: Sep. 11, 1996

[30] Foreign Application Priority Data

Sep. 13, 1995 [JP] Japan ................... 7-234842

[51] Int. Cl.$^6$ ........................... G11B 5/66
[52] U.S. Cl. .......... 428/65.3; 428/65.5; 428/336; 428/694 T; 428/694 TS; 428/694 TP; 428/694 TC; 428/698; 428/699; 428/702; 428/704
[58] Field of Search ............... 428/694 T, 694 TS, 428/694 TP, 694 TC, 800, 336, 65.3, 65.5, 704, 658, 659, 702

[56] References Cited

U.S. PATENT DOCUMENTS 5,236,791  8/1993  Yahisa ............... 428/694 TP
5,571,585  11/1996  Chiba ............... 428/141
5,585,187  12/1996  Ikeda ............... 428/611

FOREIGN PATENT DOCUMENTS 53-36205   4/1978  Japan.
61-172219  8/1986  Japan.
2-101617   4/1990  Japan.

*Primary Examiner*—Leszek Kiliman
*Attorney, Agent, or Firm*—Oblon, Spivak, McClelland, Maier & Neustadt, P.C.

[57] ABSTRACT

A magnetic disc apparatus includes a magnetic recording medium and member for recording/reproducing information in/out of the magnetic recording medium, the magnetic recording medium including a recording layer of a magnetic thin film formed on a non-magnetic substrate, and a non-magnetic protective layer formed on and thicker than the recording layer. The particular construction permits diminishing the thickness of the recording layer, making it possible to achieve a high density recording.

24 Claims, 3 Drawing Sheets

$a2 > a1$ $a2 \fallingdotseq a1$

MAGNETIC DISC APPARATUS

BACKGROUND OF THE INVENTION

1. Field of the Invention

The present invention relates to a magnetic disc apparatus.

2. Description of the Related Art

With marked improvements in the capability of electronic computers including personal computers, it is strongly required nowadays to improve performance in a magnetic disc apparatus (HDD) such as miniaturization and increase in capacity and operating speed. To meet the requirement, vigorous studies are being made in an attempt to increase the recording density of the magnetic recording medium. For achieving a high density magnetic recording, it is necessary in view of the principle of the recording/reproducing to diminish the spacing, i.e., the distance between the recording/producing head and the magnetic recording medium.

In general, a magnetic recording medium includes a non-magnetic substrate made of glass or aluminum, a magnetic thin film formed on the substrate, and a protective film covering the upper surface of the magnetic film. Nowadays, vigorous studies are being directed to decrease in the thickness of the protective film in order to diminish the spacing in question. As a matter of fact, a protective film as thin as 10 to 15 nm has already been reported. Vigorous studies are also being directed to decrease in the flying height of the magnetic head for diminishing the spacing. In fact, a flying height not larger than 0.1 μm has already been reported. A trend of the technology for decreasing the thickness of the protective film and for decreasing the flying height of the magnetic head seems to be continued, and very small flying height or head contact operation will be realized in the near future. For example, E. S. Murdock make case studies on the designs of the magnetic head and magnetic recording medium required for the recording density of 10 Gb/in$^2$ in "IEEE Trans Magn. vol. 28, No. 5, page 3078, 1992". In this article, flying height ranging from 20 nm to 70 nm, that is in the region of contact-like very small flying height, is discussed. Further, there are some reports recently on a magnetic disc system which actually performs a contact-type operation.

When it comes to the operation under a contact-like very small flying height of the magnetic head, however, the probability of the crash between the magnetic head and the magnetic recording medium is increased, giving rise to a problem of peeling off of thin film such as the protective layer or the magnetic layer. To overcome this difficulty, it is necessary to form an intermediate layer for improving the adhesion force between the protective layer and the magnetic layer or between the magnetic layer and substrate, or to apply, for example, a sputter etching to the substrate and/or the films for improving the adhesion force noted above. An additional difficulty to be noted is an internal stress within the protective film which is brought from the differences in mechanical properties between the protective film and the magnetic thin film. This internal stress result to the decrease in the mechanical strength of the protective film and to the increase of the probability of the peeling off of the protective layer.

In addition to the reduction in the spacing noted above, an extensive research is being made nowadays to diminish Mrδ (the product of a residual magnetization and a film thickness) for achieving a high density recording, particularly in the case of a longitudinal recording. With regard to decreasing the thickness of a magnetic thin film, however, a dead layer several nanometers thick, which is formed in the initial stage of the thin film growth, decreases the coercivity of the magnetic thin film, with the result that it is impossible to form a magnetic film thinner than about 15 nm. Also, when the magnetic film is unduly thin, the magnetic crystal grains become so small that a super paramagnetism is occurred, and a stable magnetic recording can not be achieved. Therefore, the lower limit in the thickness of the magnetic thin film is considered to be about 15 to 20 nm. As a matter of fact, Murdock discusses a magnetic thin film having a thickness of 10 to 15 nm in the article referred to previously, and he says the thickness noted above results from various breakthroughs. It is also described that, even in this case, the difficulty in terms of the super paramagnetism remains to be a big problem to be solved.

Under the circumstances, since it is difficult to reduce the Mrδ, an extensive research is being made on the contact-like very small flying height of the magnetic head as a practical technology for a high density recording.

SUMMARY OF THE INVENTION

The present invention, which has been achieved in an attempt to overcome the above-noted problems inherent in the prior art, is intended to provide a magnetic recording disc apparatus which permits reducing the spacing between the magnetic recording medium and the magnetic head and also permits a high density recording.

According to the present invention, there is provided a magnetic disc apparatus, comprising a magnetic recording medium including a non-magnetic substrate, a recording layer of a magnetic thin film formed on the non-magnetic substrate, and a non-magnetic protective layer formed on and thicker than the magnetic layer, and means for recording/reproducing information in/out of said magnetic recording medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 1:
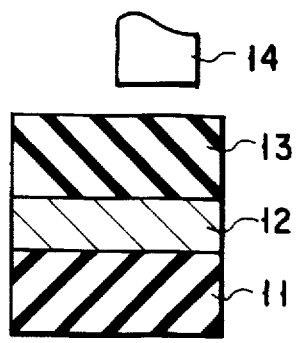
FIG. 1 is a cross sectional view showing the construction of a magnetic recording medium according to a first embodiment of the present invention.

FIG. 1 shows the construction of a magnetic disc apparatus according to a first embodiment of the present invention. As seen from the drawing, the apparatus includes of a magnetic recording medium and a recording/reproducing head 14, said magnetic recording medium including a non-magnetic substrate 11, a magnetic thin film (recording layer) 12 formed on the non-magnetic substrate 11, and a protective layer 13 formed on the magnetic thin film 12.

Where two thin films are laminated one upon the other, the internal stress or strain of each thin film is generated by an energy caused by the differences between the two films in mechanical and structural characteristics such as the thermal expansion coefficient and lattice constant. The internal stress or strain thus generated is transmitted within each thin film in a manner to moderate the energy. It follows that a large stress is generated in the vicinity of the interface between the two films. This stress decreases to become an inherent lattice state with increase in the distance from the interface.

It is considered that the magnitude of the energy to keep the state of crystal lattice inherent relative to the energy in the interface is proportional to the number of atoms constituting each thin film and can be determined by the ratio in thickness of the two films. Suppose thin films A and B are laminated one upon the other. When film A is thicker than film B, film A has a larger energy to maintain the lattice state inherent, then the lattice state of entire laminate structure of films A and B becomes that inherent in film A. As a result, internal stress is generated in large film B. When film B is not thick enough to moderate the interfacial surface energy to achieve the lattice state inherent in film B, the lattice constant in the entire region of film B is changed.

What should be noted is that, in the magnetic recording medium included in the magnetic disc apparatus of the present invention, the magnetic thin film is thinner than the protective layer, with the result that the internal stress of the protective layer is diminished. It follows that peeling of the protective film from the magnetic thin film, which is caused by the internal stress of the protective layer, is unlikely to take place. Of course, the magnetic recording medium is enabled to exhibit an improved durability against an external impact such as contact of a magnetic head with the recording medium. Further, the recording/reproducing operation can be performed with the flying height of the magnetic head held at a low level, making it possible to achieve a high density magnetic recording.

In the conventional magnetic recording medium, it was necessary to deposit an additional thin film for improving the adhesion force between the magnetic thin film and the protective layer or to apply a surface-denaturing treatment such as a sputter etching. In the magnetic recording medium of the present invention, however, the protective layer is strongly adhered to the magnetic thin film, making it unnecessary to take any measure for improving the adhesion force between the two. In other words, it suffices to take measures for improving the adhesion force between the substrate and the magnetic thin film, leading to simplification of the manufacturing process and to an improved yield of the magnetic recording medium. Even where some measures are taken for further improving the adhesion force between the magnetic thin film and the protective layer, these measures can be taken more easily than in the conventional technique.

It should be noted that the reduction in the internal stress of the protective layer permits suppressing the surface roughness of the protective layer, leading to further reduction in the flying height of the magnetic head and, thus, to further improvement in the recording density.

When the magnetic thin film is not so thick that it is impossible to maintain the lattice conditions inherent in the film, in the magnetic recording medium of the present invention, the entire magnetic thin film is distorted, as already described. In this case, the interfacial surface energy is smaller than that of the case when the magnetic thin film is thick enough to maintain the lattice condition inherent in the film. This effect is combined with the reduction in the internal stress of the protective layer so as to further improve the adhesion force between the magnetic thin film and the protective layer. Naturally, the protective layer is more unlikely to be peeled off the magnetic thin film.

It is generally known to the art that, if strain is generated within a magnetic thin film, the magnetic characteristics of the film are changed. Where a magnetic thin film is grown by the ordinary method, the strain in the initially grown region is different from that in the other region, with the result that the grown magnetic thin film includes two regions differing from each other in the magnetic characteristics. In the magnetic recording medium of the present invention, the magnetic film is so thin that strain is generated from the interface into the entire region of the film including both the initially grown region and the other region so as to diminish the difference in magnetic properties between these two regions. This is equivalent to the reduction in the thickness of the initially grown region (dead layer). Therefore, in the present invention, it is possible to fabricate a magnetic recording film thinner than 20 to 15 nm. As described previously, the reduction in the thickness of the magnetic thin film permits achieving a high density magnetic recording and also leading to reduction in the manufacturing cost of the recording medium.

The strain generated within the magnetic recording medium also produces a desirable effect in terms of a magnetic anisotropic energy. Specifically, an anisotropic energy is imparted in a certain direction to the magnetic recording medium by a strain generation. Since the magnetic anisotropic energy produced by the strain generation gives assistance to a crystal inductive anisotropy or a shape magnetic anisotropy, a large coercive force and a large magnetization, which are important for achieving a high density magnetic recording, can be obtained easily.

Further, with increase in the magnetic anisotropic energy caused by the strain generation, an occurrence of the super paramagnetism referred to previously is suppressed even if the thickness of the magnetic thin film is decreased. As a result, a coercive force is increased and the stability of the magnetic domain for recording is increased. It should be noted that the super paramagnetism is caused by the relationship in magnitude between the heat disturbance energy relating to ambient temperature and the magnetic energy of the magnetization rotation unit within the magnetic thin film. When it comes to the ordinary magnetic recording medium, the magnetization rotation unit represents the crystal grain in the magnetic thin film. On the other hand, the magnetic energy is represented by the product between the size of the crystal grain and the magnetic anisotropic energy density. In general, the length of the crystal grain in the thickness direction of the film is decreased with decrease in the thickness of the magnetic thin film. It follows that the magnetic energy is decreased with decrease in the thickness of the magnetic thin film, with the result that the super paramagnetism is likely to take place. When it comes to the magnetic recording medium of the present invention, however, the magnetic anisotropic energy is increased in spite of decrease in the length of the crystal grain in the thickness direction of the film. It follows that the magnetic energy is not decreased even if the thickness of the magnetic thin film is decreased.

The strain is generated within the magnetic thin film in the case where the protective layer is thinner than the magnetic thin film as in the prior art. In this case, however, stress is also generated on the side of the protective layer. Further, strain is concentrated in the interfacial region between the magnetic thin film and the protective layer so that the strain exhibits a distribution in the thickness direction of the film. As a result, the magnetic characteristics change along the thickness direction of the film so as to cause the inversion magnetic domain to become unstable, leading to noise or jitter generation.

It is desirable to use materials having a large saturation magnetization (Is) and a large magnetic anisotropic energy for forming the magnetic thin film included in the magnetic disc apparatus of the present invention. In view of these requirements, it is desirable to use at least one material selected from the group consisting of Co, Pt, Sm, Fe, Ni, Cr, Mn, Bi, Al and alloys thereof for forming the magnetic thin film. Among these materials, it is desirable to use Co-based alloys having a large crystal magnetic anisotropic energy, particularly alloys containing CoPt or SmCo as a main component. Further, it is desirable to add at least one element selected from Fe and Ni to the magnetic material noted above for the alloying purpose in an attempt to control the magnetic characteristics. Further, an additive selected from the group consisting of, for example, Cr, Nb, V, Ta, Ti, W, Hf, In, Si and B may be added to the magnetic material consisting of the metal or alloy thereof noted above for improving the magnetic characteristics of the magnetic thin film. Alternatively, a compound between any of the additive elements noted above and at least one of an oxygen, a nitrogen, a carbon and a hydrogen may be added in place of the additive element to the magnetic material.

In general, it is difficult to determine accurately the physical properties which the protective layer should satisfy in order to prevent a magnetic recording medium from incurring a damage when a magnetic head is brought into contact with the magnetic recording medium. However, it may be reasonable to employ a hardness as a criterion of the required physical properties. In principle, the damage done to the magnetic thin film by the contact with a magnetic head is considered to be diminished with increase in hardness of the protective layer. Therefore, it is desirable to use a material having a high hardness under a bulk state for forming the protective layer included in the magnetic disc apparatus of the present invention. For example, it is desirable to use a compound represented by a general formula M—G, where M is at least one element selected from the group consisting of Si, Al, Zr, Ti, In, Sn and B, G is at least one element selected from the group consisting of an oxygen, a nitrogen and a carbon. The specific compounds suitable for forming the protective layer include, for example, Si—O Al—O, Zr—O, Ti—O, Si—N, Al—N, Zr—N, Ti—N, B—N, Si—C, Ti—C, B—C, SiAl—ON, Si—ON, AlTi—OC and In—Sn—O. It is also desirable to use carbon allotropes such as diamond, amorphous carbon and diamond-like carbon. Further, it is desirable to use a material having a graphite structure for forming the protective layer because the impact accompanying the contact of the magnetic head with the protective layer is moderated by the sliding among atoms so as to prevent the magnetic recording medium from incurring damage. The particular material includes, for example, carbon (graphite).

In the present invention, a metal, glass, and ceramics can be used for forming the substrate supporting the magnetic thin film and the protective layer. Incidentally, an intermediate layer made of a magnetic or non-magnetic material can be formed between the substrate and the magnetic thin film.

In order to enable the magnetic thin film to perform the recording/reproducing function effectively, the intermediate layer made of a magnetic material should be formed to achieve a magnetic coupling with the magnetic domain of the magnetic thin film and with the recording/reproducing head by means of an exchange interaction and magnetostatic interaction. In the case where the magnetic intermediate layer is formed to achieve an exchange coupling with the magnetic domain, it is possible to use a magnetic intermediate layer whose magnetization is likely to be reversed so as to stabilize the magnetic domain of the magnetic thin film. Alternatively, it is possible to use a magnetic intermediate layer having a high magnetization so as to increase the reproduced output.

On the other hand, the intermediate layer made of a non-magnetic material is intended to control the crystal structure of the magnetic thin film or to prevent the impurities contained in the substrate from being migrated into the magnetic thin film. In the case where the intermediate layer is formed of, for example, a material having a lattice space close to that of a desired crystal orientation of the magnetic thin film, it is possible to control the crystal state of the magnetic thin film. Also, in the case where the intermediate layer is formed of, for example, an amorphous material having a surface energy which permits improving the wettability with the magnetic thin film, it is possible to improve the crystallinity of the magnetic thin film. Further, for preventing the impurities contained in the substrate from being migrated into the magnetic thin film, it is desirable to use an intermediate layer formed of a material having a small lattice space. Alternatively, a thin film having a high density may be used as the intermediate layer.

Incidentally, it is possible to form an intermediate layer which performs the functions performed by those formed by a magnetic material and a non-magnetic material. For example, it is possible to form a magnetic intermediate layer which permits controlling the crystallinity of the magnetic thin film. It is also possible to denature the surface of the substrate by means of ion plating, doping under an ambient gas, or neutron beam irradiation so as to form a layer acting as an intermediate layer. In this case, the process of a thin film deposition need not be employed, leading to simplification in the manufacturing process of the magnetic recording medium.

In the present invention, the magnetic thin film is magnetized in a predetermined direction in accordance with information corresponding to the magnetic recording system, making it possible to achieve a longitudinal recording, an oblique recording or a perpendicular recording. Also, the magnetic recording medium used in the present invention can be employed in the system in which the recording/reproducing head is brought into contact with the magnetic recording medium or in the system in which the head floats apart from the magnetic recording medium.

The magnetic head used in the present invention can be selected from among conventional recording/reproducing heads in view of the requirement of the magnetic recording system. For achieving a high density magnetic recording, it is desirable to use a magnetoresistance type reproducing head having a high reproducing sensitivity, for example, a spin-value type GMR (Giant Magneto-Resistance) head.

In the present invention, it is possible to provide a partial direct contact region between the non-magnetic substrate and the non-magnetic protective layer so as to suppress peeling of the protective layer from the magnetic recording medium. The direct contact region can be provided anywhere on the disc surface. Naturally, the number of interfaces included in the direct contact region between the substrate and the protective layer is smaller than that in the other region, making the protective layer less likely to peel from the magnetic recording medium. Also, the presence of the direct contact region causes that region of the protective layer which is positioned in the vicinity thereof to be less likely to peel from the magnetic recording medium. It is also desirable to provide a plurality of direct contact regions for improving the adhesion force of the protective layer. For preventing the memory capacity of the disc from being decreased, the direct contact region in question should be positioned outside the data area. In the case where a direct contact region is included in the data area, the particular region of the data area should be set in advance not to be used as a recording area.

If the magnetic characteristics of the magnetic thin film in the thickness direction of the film are rendered nonuniform by the stress concentrated in the initially grown layer and around the interface of the film, the boundary region of the reversible domain is disturbed so as to cause recording noise or jitter. It should be noted that the magnitude of disturbance in the boundary region of the reversible domain, which causes a problem in the recording/reproducing characteristics of the magnetic disc apparatus, is determined by the relationship between the magnitude of disturbance and the size of the reversible domain, i.e., recording wavelength. In other words, the influence given by the stress concentrated in the initially grown region and around the interfaces of the magnetic thin film affecting the magnetic characteristics of the film is strongly dependent on the thickness of the magnetic thin film. It follows that the recording noise and jitter caused by the disturbance of the reversible domain can be represented by the relationship between the thickness of the magnetic thin film and the recording wavelength.

If the magnetic thin film is thicker than the protective layer, a stress distribution takes place in the magnetic thin film in the thickness direction of the film. Also, increased is the nonuniformity in the magnetic characteristics caused by the presence of the initially grown layer. As a result, the reversible domain is rendered easy to be disturbed. It follows that it is impossible to obtain a satisfactory signal/noise ratio (S/N ratio) unless the recording wavelength is considerably longer than the thickness of the magnetic thin film. In the present invention, however the nonuniformity of the magnetic characteristics in the thickness direction of the film is reduced. As a result, a large S/N ratio can be obtained with a shorter recording wavelength, compared with the prior art. In view of the spacing margin and manufacturing cost of the magnetic recording medium as well as the produced effect in terms of the S/N ratio, it is desirable to set the shortest wavelength of the recording information at a level at most 10 times as much as the thickness of the magnetic thin film.

As described above, the adhesion force and uniformity of the magnetic characteristics in the thickness direction of the magnetic thin film can be improved by allowing stress or strain to be concentrated on the film. For obtaining the same effect, it is also desirable to form an intermediate layer, which is similar to the protective layer. For example, it is effective to form an intermediate layer such that the deviation in lattice constant of the magnetic thin film in the structure of substrate/magnetic thin film/protective layer is equal to that of substrate/intermediate layer/magnetic thin film. In this case, it is desirable in view of the manufacturing process to make the intermediate layer and the protective layer equal to each other in the material. However, in the case where the magnetic characteristics of the magnetic thin film are likely to be adversely affected or where the function of improving the recording/reproducing characteristics is to be imparted to the intermediate layer, it is desirable to make the intermediate layer and the protective layer different from each other in the material. It should be noted that, in the case where the magnetic thin film is sandwiched between the protective layer and the intermediate layer equal to the protective layer in the mechanical structure, the stress is more likely to be concentrated on the magnetic thin film and the strain is likely to be generated uniformly in the thickness direction of the magnetic thin film. Further, the thickness of the magnetic thin film can be increased for bringing about the strain of the same level, making it possible to suppress the effect given by the initially grown layer of the magnetic thin film and to decrease the influence of the super paramagnetism.

It is desirable for the magnetic thin film to have a thickness of at most 25 nm, preferably at most 10 nm, in order to permit the entire magnetic thin film to be strained so as to moderate the interfacial surface energy. If the thickness is unduly small, however, the film cannot be used as a magnetic thin film. It is practical to set the lower limit of the thickness at 5 nm. In the case where, for example, the magnetic thin film is made of cobalt, Co atom having a diameter of 0.25 nm, the ratio of the Co atoms exposed to both surfaces of the film to all the Co atoms forming the film is 1/50 where the film is 25 nm thick, and 1/20 where the film is 10 nm thick. In the case where the thickness is on this order, the entire magnetic thin film is considered to be strained so as to moderate the interfacial surface energy.

The protective layer should be thicker than the magnetic thin film. If the protective layer is unduly thick, however, the magnetic thin film is rendered unduly apart from a magnetic head during operation of the magnetic disc apparatus. Therefore, the protective layer should be as thin as possible, as far as the function as a protective layer can be produced. In practice, the thickness of the protective layer should fall within a range of between 20 nm and 40 nm.

The prominent effect of the present invention is fully supported by Examples of the present invention given below:

EXAMPLE 1

A magnetic disc drive apparatus having a magnetic recording medium and a magnetic head 14, said magnetic recording medium including a glass substrate 11, a magnetic thin film 12 and a non-magnetic protective layer 13, was prepared by forming the magnetic thin film 12 on the glass substrate 11, followed by forming the protective layer 13 on the magnetic thin film 12 and subsequently disposing the magnetic head 14, as shown in FIG. 1. The magnetic thin film (CoPtCrTa film) 12 was formed by a sputtering method using a CoPtCrTa target. On the other hand, the protective layer (SiO$_2$ layer) 13 was also formed by a sputtering method using an SiO$_2$ target.

Figure 2:
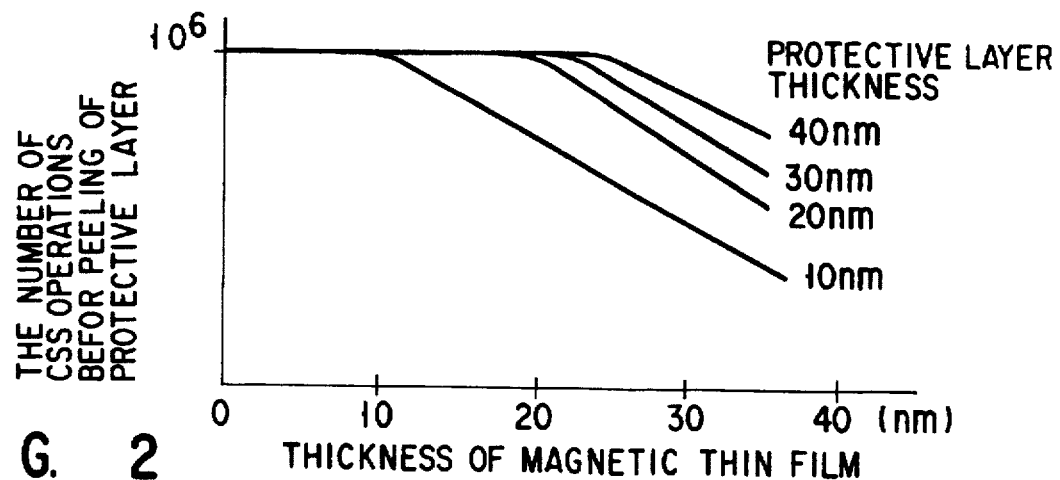
FIG. 2 is a graph showing the relationship between the thickness of each of a magnetic thin film and a protective layer and the number of CSS (Contact-Start-Stop) operations that can be withstood by the protective layer.

Various samples of the magnetic recording medium of the construction described above were prepared. In these samples, each of the magnetic thin film and the protective layer was controlled to have a thickness falling within a range of between 10 nm and 40 nm. Contact-Start-Stop (CSS) operations of the magnetic head 14 were consecutively performed 10$^6$ times using the samples of the magnetic recording medium so as to detect the number of CSS operations causing the protective layer to have peeled off the magnetic thin film. FIG. 2 shows the results. As apparent from the experimental data given in FIG. 2, the peeling took place quite easily where the magnetic thin film was thicker than the protective layer.

EXAMPLE 2

A magnetic recording medium was prepared by forming a magnetic thin film 12 on a glass substrate 11, followed by forming a non-magnetic protective layer 13 on the magnetic thin film 12, as shown in FIG. 1. The magnetic thin film (CoPtCrO film) 12 was formed by a sputtering method using a CoPtCr target. On the other hand, the protective layer (C layer) 13 was also formed by a sputtering method using a C target. Oxygen was not positively introduced into the magnetic thin film during the sputtering operation. However, presence of O in the magnetic thin film was confirmed as a result of an analysis.

Figure 3A:
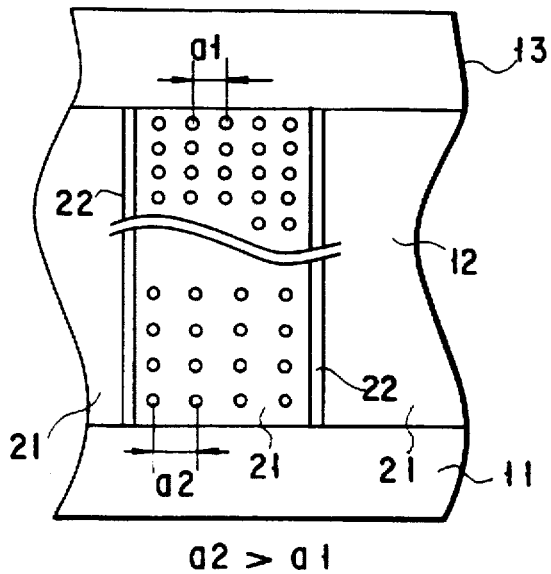
FIG. 3A schematically shows a cross sectional TEM image of a magnetic recording medium having a conventional construction.

A cross section of each of a conventional magnetic recording medium comprising the magnetic thin film 12 having a thickness of 15 nm and the non-magnetic protective layer 13 having a thickness of 10 nm and a magnetic recording medium of the present invention comprising the magnetic thin film 12 having a thickness of 15 nm and the non-magnetic protective layer 13 having a thickness of 20 nm was examined by a transmission electron microscope (TEM). FIGS. 3A (prior art) and 3B (present invention) schematically show the cross sectional TEM images. As shown in the drawings, the magnetic thin film 12 was found to consist of columnar crystal grains 21. Also, a lattice image was recognized in each crystal grain 21. Incidentally, reference numeral 22 denotes a boundary between adjacent crystal grains 21.

Figure 3B:
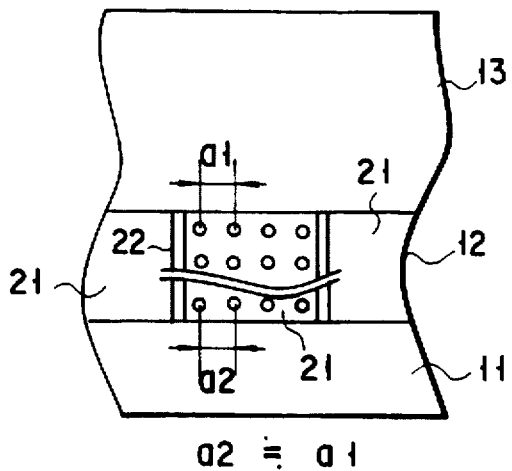
FIG. 3B schematically shows a cross sectional TEM image of a magnetic recording medium having a construction specified in the present invention.

An absolute value of a ratio of $(a_2-a_1)/a_1$, i.e., the value of $|(a_2-a_1)/a_1|$, where $a_1$ denotes an average value of the lattice spaces of the magnetic thin film 12 on the side of the protective layer 13, and $a_2$ represents an average value of the lattice spaces of the magnetic thin film 12 on the side of the glass substrate 11, was measured for each of the conventional magnetic recording medium and the magnetic recording medium of the present invention. The value for the conventional magnetic recording medium (FIG. 3A) was found to be 22% in contrast to only 7% for the magnetic recording medium of the present invention shown in FIG. 3B. Also, the coercive force was found to be 1.5 kOe for the conventional magnetic recording medium and 3 kOe for the magnetic recording medium of the present invention. It is considered reasonable to understand that in the magnetic recording medium of the present invention, since a difference in the lattice space between the uppermost and lowermost regions of the magnetic thin film is small, the influence of the initially grown layer, i.e., the factor lowering the coercive force such as an increasing the exchange interaction or a decreasing the magnetic anisotropy energy, is lowered. Incidentally, the value of 7% given above denotes that $a_2$ and $a_1$ of the magnetic thin film 12 were substantially equal to each other in the construction specified in the present invention. In other words, the strain was found to be substantially uniform in a thickness direction of the film 12.

Figure 4A:
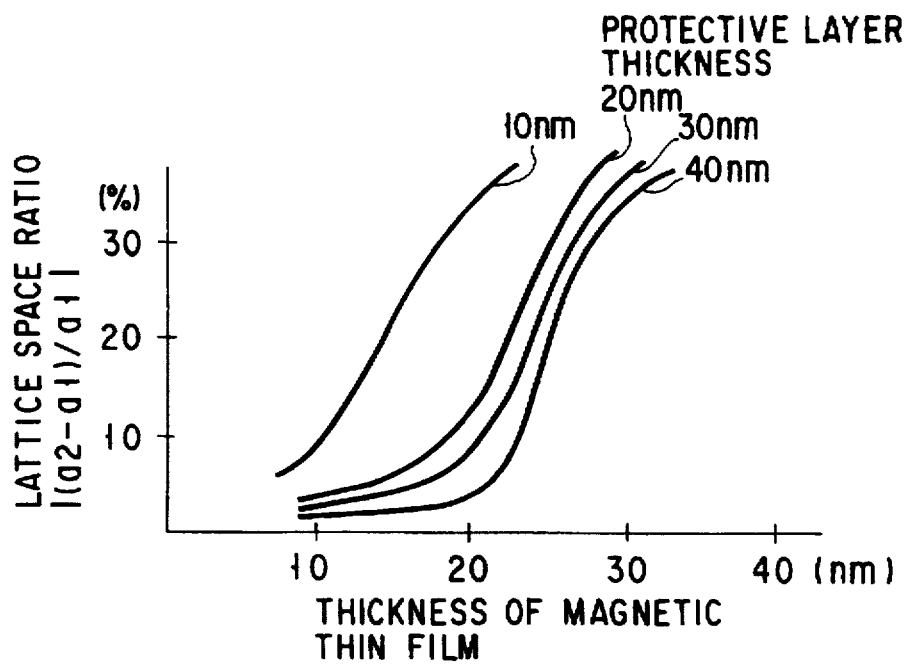
FIG. 4A is a graph showing the relationship between the lattice distance ratio and the thickness of the magnetic thin film, with the thickness of the protective layer used as a parameter.
Figure 4B:
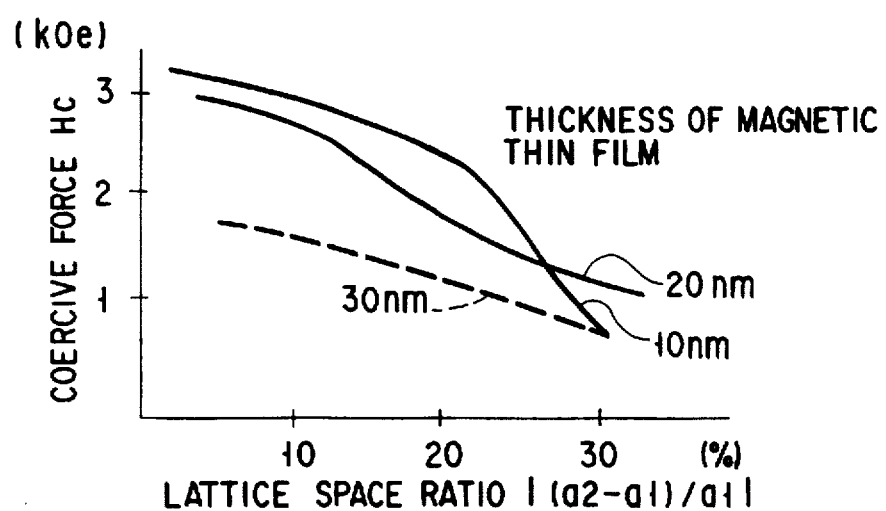
FIG. 4B is a graph showing the relationship between the lattice distance ratio and the coercive force, with the thickness of the magnetic thin film used as a parameter.

An additional experiment was conducted by preparing various samples of the magnetic recording medium as above, except that the thickness of each of the magnetic thin film 12 and the protective layer 13 was set at various values. The absolute value of the lattice space ratio $|(a_2-a_1)/a_1|$ given above and the coercive force were measured for each sample, with the results as shown in the graphs of FIGS. 4A and 4B. As already pointed out, it is desirable for the values of $a_1$ and $a_2$ to be close to each other in order to improve the coercive force. To be more specific, it is desirable for the absolute value of the lattice space ratio $|(a_2-a_1)/a_1|$ to be 20% or less. This is supported by FIG. 4A showing that the lattice space ratio is particularly small in the case where the magnetic thin film 12 has a thickness of 25 nm or less and is thinner than the protective layer 13. As a matter of fact, FIG. 4B shows that a high coercive force is exhibited in the case where the above-noted condition is satisfied, i.e., where the lattice space ratio is 20% or less and the thickness of the magnetic thin film is 25 nm or less.

Figure 5:
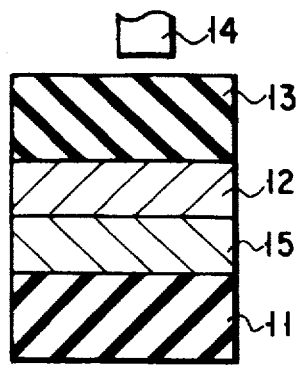
FIG. 5 is a cross sectional view showing the construction of a magnetic recording medium according to a second embodiment of the present invention.
Figure 6:
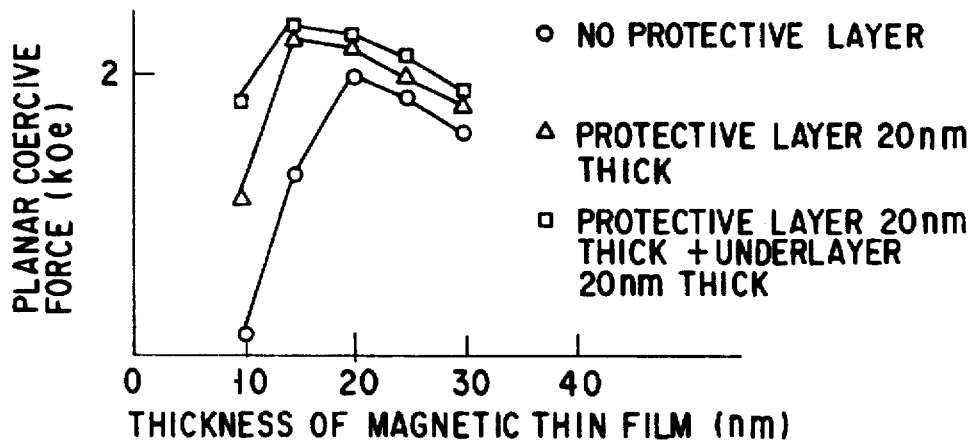
FIG. 6 is a graph showing the relationship between the thickness of the magnetic thin film and the planar coercive force in respect of the presence or absence of a protective layer.

A still additional experiment was conducted by preparing a magnetic disc drive apparatus constructed as shown in FIG. 5, i.e., an apparatus comprising a magnetic recording medium and a magnetic head 14, said magnetic recording medium including a glass substrate 11, an intermediate layer 15 formed on the substrate 11, a magnetic thin film 12 formed on the intermediate layer 15, and a non-magnetic protective layer 13 formed on the magnetic thin film 12. The apparatus shown in FIG. 5 is substantially equal to that shown in FIG. 1, except that the intermediate layer made of SiO$_2$ and having a thickness of 20 nm is included in the apparatus shown in FIG. 5. The magnetic recording medium included in the apparatus shown in each of FIGS. 1 and 5 has been found to exhibit a planar magnetic anisotropy. FIG. 6 is a graph showing the relationship between the thickness of the magnetic thin film and the coercive force in the planar direction.

The graph of FIG. 6 covers three cases where a protective layer is not included in the magnetic recording medium, where a protective layer 20 nm thick is included in the magnetic recording medium, and where an intermediate layer is included in the magnetic recording medium. A change in the planar coercive force relative to the thickness (30 nm, 25 nm 20 nm, 15 nm and 10 nm) of the magnetic thin film was measured for each of these cases. FIG. 6 clearly shows that a coercive force is rapidly lowered if the thickness of the magnetic thin film is smaller than 25 nm in the case where a protective layer is not included in the magnetic recording medium. It is also shown that a large coercive force is exhibited if the thickness of the magnetic thin film is not smaller than about 15 nm in the case where a protective layer 20 nm thick is included in the magnetic recording medium. Further, in the case where an intermediate layer is included in the magnetic recording medium, such a large coercive force as about 2 kOe can be exhibited even if the magnetic thin film is as thin as 10 nm. It is considered reasonable to understand from the experimental data that a protective layer thicker than the magnetic thin film is effective for imparting a magnetic anisotropy, which is derived from strain, to the magnetic thin film so as to increase the coercive force and to suppress generation of a super paramagnetism, with the result that a magnetic thin film having a very small thickness is enabled to exhibit a large coercive force.

EXAMPLE 3

A magnetic recording medium constructed as shown in FIG. 1 was prepared as in Example 1 using a glass substrate having a diameter of 2.5 inches, followed by preparing a magnetic disc drive apparatus. In the step of forming the magnetic thin film included in the magnetic recording medium, the pressure of the sputtering gas was set at 1.5 Pa in preparing sample (a) and at 5 Pa in preparing sample (b).

An additional experiment was conducted in an attempt to look into the properties of the magnetic thin film itself. In this case, a magnetic thin film alone was formed by means of sputtering method under a sputtering gas pressure of 1.5 Pa or 5 Pa on a silicon substrate. Each of the magnetic thin films thus formed was observed with a TEM. The magnetic thin film formed under a high sputtering gas pressure (5 Pa) was found to be porous. In other words, voids of a considerably large size were found to be present between adjacent crystal grains.

Each of samples (a) and (b) of the magnetic recording medium was set in an optical disc testing apparatus for looking into the defective portion of the magnetic thin film by using a laser beam so as to prepare a map of portions where the reflectance is locally changed. It has been found that a plurality of vacant portions (voids) are included in sample (b). A cross section of the vacant portion was observed with a TEM. It has been found that $SiO_2$ grains migrated from the protective layer are present in the vacant portion such that these $SiO_2$ grains are in direct contact with the substrate.

CSS operations were applied to samples (a) and (b) as in Example 1, except that the load applied to the magnetic head was changed variously to fall within a range of between 10 and 1.5 times as much as that in the ordinary recording/reproducing operations so as to detect the number of CSS operations causing the magnetic thin film to peel off the substrate. Sample (b) was found to have a durability about 5 times as high as that of sample (a) on the average.

EXAMPLE 4

Figure 7:
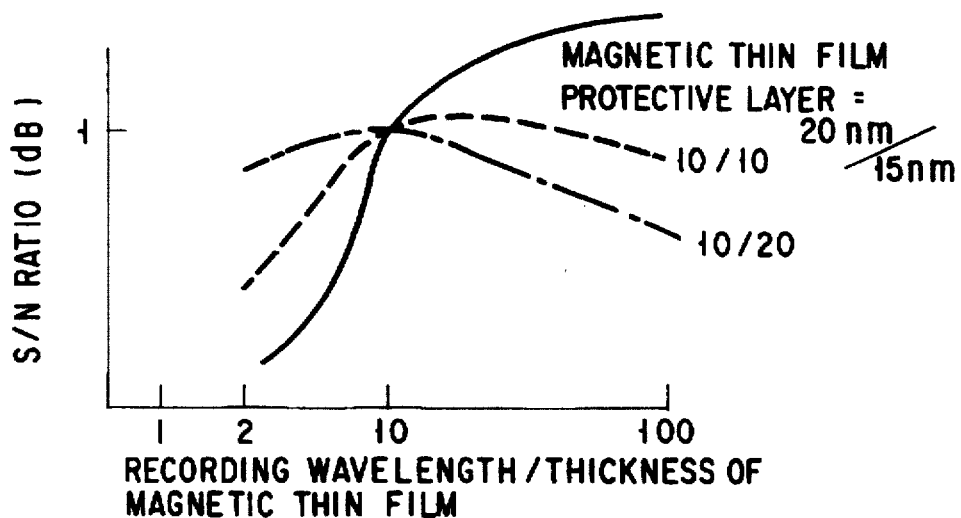
FIG. 7 is a graph showing the relationship between the signal/noise ratio and the ratio of the recording wavelength to the thickness of the magnetic thin film using as a parameter the thickness of each of the magnetic thin film and the protective layer.

A magnetic disc drive apparatus similar to that in Example 1 was prepared, and the recording/reproducing operations were performed under various kinds of a single recording wavelength so as to measure the S/N ratio relative to the ratio of the recording wavelength to the thickness of the magnetic thin film. FIG. 7 is a graph showing the results. The sample of the magnetic disc drive apparatus included a magnetic thin film made of CoPt—O and a protective layer made of carbon (C). Three samples, in which the thicknesses of the magnetic thin film/protective film were 20 nm/15 nm, 10 nm/10 nm and 10 nm/20 nm, were tested.

In the graph of FIG. 7, the S/N ratio was plotted on the ordinate. The S/N ratio was set at 1 for the case where the ratio of the recording wavelength to the thickness of the magnetic thin film was 10. The flying height of the magnetic head was set at an optimum value under the condition that the ratio of the recording wavelength to the thickness of the magnetic thin film was 10. As apparent from FIG. 7, in the case where the protective layer is thicker than the magnetic thin film, the S/N ratio is large even if the ratio of the recording wavelength to the thickness of the magnetic thin film is less than 10. Particularly, in the case where the magnetic recording medium included a magnetic thin film 10 nm thick and a protective layer 20 nm thick, a sharp deterioration in the S/N ratio was not recognized even under such a high density recording that the ratio of the recording wavelength to the thickness of the magnetic thin film was only 2.

As described above in detail, the present invention provides a magnetic disc apparatus which permits suppressing the floating amount of the magnetic head during the recording/reproducing operation, which permits using a magnetic thin film thinner than that used in the past, and which permits a high density recording.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A magnetic disc apparatus, comprising:
    a magnetic recording medium including a non-magnetic substrate, a recording layer of a magnetic thin film formed on the non-magnetic substrate, and a non-magnetic protective layer formed on a recording layer, wherein said non-magnetic protective layer is thicker than the total recording layer; and
    means for recording/reproducing information in/out of said magnetic recording medium.

2. The magnetic disc apparatus according to claim 1, wherein said non-magnetic substrate and said non-magnetic protective layer are partially brought into direct contact with each other.

3. The magnetic disc apparatus according to claim 2, wherein said non-magnetic substrate and said non-magnetic protective layer are brought into direct contact with each other in a region other than the data area.

4. The magnetic disc apparatus according to claim 1, wherein the lattice distance in a magnetic thin film on the side of the non-magnetic substrate is substantially equal to that on the side of the non-magnetic protective layer.

5. The magnetic disc apparatus according to claim 1, wherein an absolute value of the lattice distance ratio defined as $|(a_2-a_1)/a_1|$, where $a_2$ is the lattice space in the magnetic thin film on the side of the non-magnetic substrate, and $a_1$ is the lattice distance in the magnetic thin film on the side of the non-magnetic protective layer, is 20% or less.

6. The magnetic disc apparatus according to claim 1, wherein said magnetic thin film contains at least one metal selected from the group consisting of Co, Pt, Sm, Fe, Ni, Cr, Mn, Bi, Al and alloys thereof.

7. The magnetic disc apparatus according to claim 6, wherein said magnetic thin film contains a Co alloy.

8. The magnetic disc apparatus according to claim 1, wherein said magnetic thin film has a thickness falling within a range of between 5 nm and 25 nm.

9. The magnetic disc apparatus according to claim 1, wherein said non-magnetic protective layer contains a material selected from the group consisting of Si—O, Al—O, Zr—O, Ti—O, Si—N, Al—N, Zr—N, Ti—N, B—N, Si—C, Ti—C, B—C, SiAl—ON, Si—ON, AlTi—OC and In—Sn—O.

10. The magnetic disc apparatus according to claim 9, wherein said non-magnetic protective layer contains a material selected from the group consisting of $SiO_2$ and C.

11. The magnetic disc apparatus according to claim 1, wherein said non-magnetic protective layer has a thickness of 20 to 40 nm.

12. The magnetic disc apparatus according to claim 1, wherein an intermediate layer is formed between said non-magnetic substrate and said magnetic thin film.

13. The magnetic disc apparatus according to claim 12, wherein said intermediate layer contains the same material with that forming said non-magnetic protective layer.

14. The magnetic disc apparatus according to claim 12, wherein said intermediate layer contains an amorphous material.

15. The magnetic disc apparatus according to claim 1, wherein said recording/reproducing means is brought into contact with said magnetic recording medium in the step of recording/reproducing information.

16. The magnetic disc apparatus according to claim 1, wherein the shortest wavelength of recording information is at most 10 times as long as the thickness of said magnetic thin film.

17. A magnetic recording medium, comprising a non-magnetic substrate, a recording layer of a magnetic thin film having a thickness of 5 to 25 nm and formed on the non-magnetic substrate, and a non-magnetic protective layer formed on and thicker than the recording layer.

18. The magnetic recording medium according to claim 17, wherein said non-magnetic substrate and said non-magnetic protective layer are partially brought into direct contact with each other.

19. The magnetic recording medium according to claim 17, wherein a lattice distance in the magnetic thin film on the side of the non-magnetic substrate is substantially equal to that on the side of the non-magnetic protective layer.

20. The magnetic recording medium according to claim 17, wherein the absolute value of the lattice space ratio defined as $|(a_2-a_1)/a_1|$, where $a_2$ is a lattice distance in the magnetic thin film on the side of the non-magnetic substrate, and $a_1$ is the lattice space in the magnetic thin film on the side of the non-magnetic protective layer, is 20% or less.

21. A magnetic disc apparatus, comprising:

a magnetic recording medium including a non-magnetic substrate, a recording layer of a magnetic thin film formed on the non-magnetic substrate, and a non-magnetic protective layer formed on and thicker than the recording layer; and a magnetic head for recording/reproducing information in/out of said magnetic recording medium.

22. The magnetic disc apparatus according to claim 21, wherein said magnetic head has a recording head portion and a reproducing head portion.

23. The magnetic disc apparatus according to claim 22, wherein said reproducing head portion has a magnetoresistance head.

24. The magnetic disc apparatus according to claim 23, wherein said magnetoresistance head is a spin-value type GMR head.

* * * * *